Figure 1:
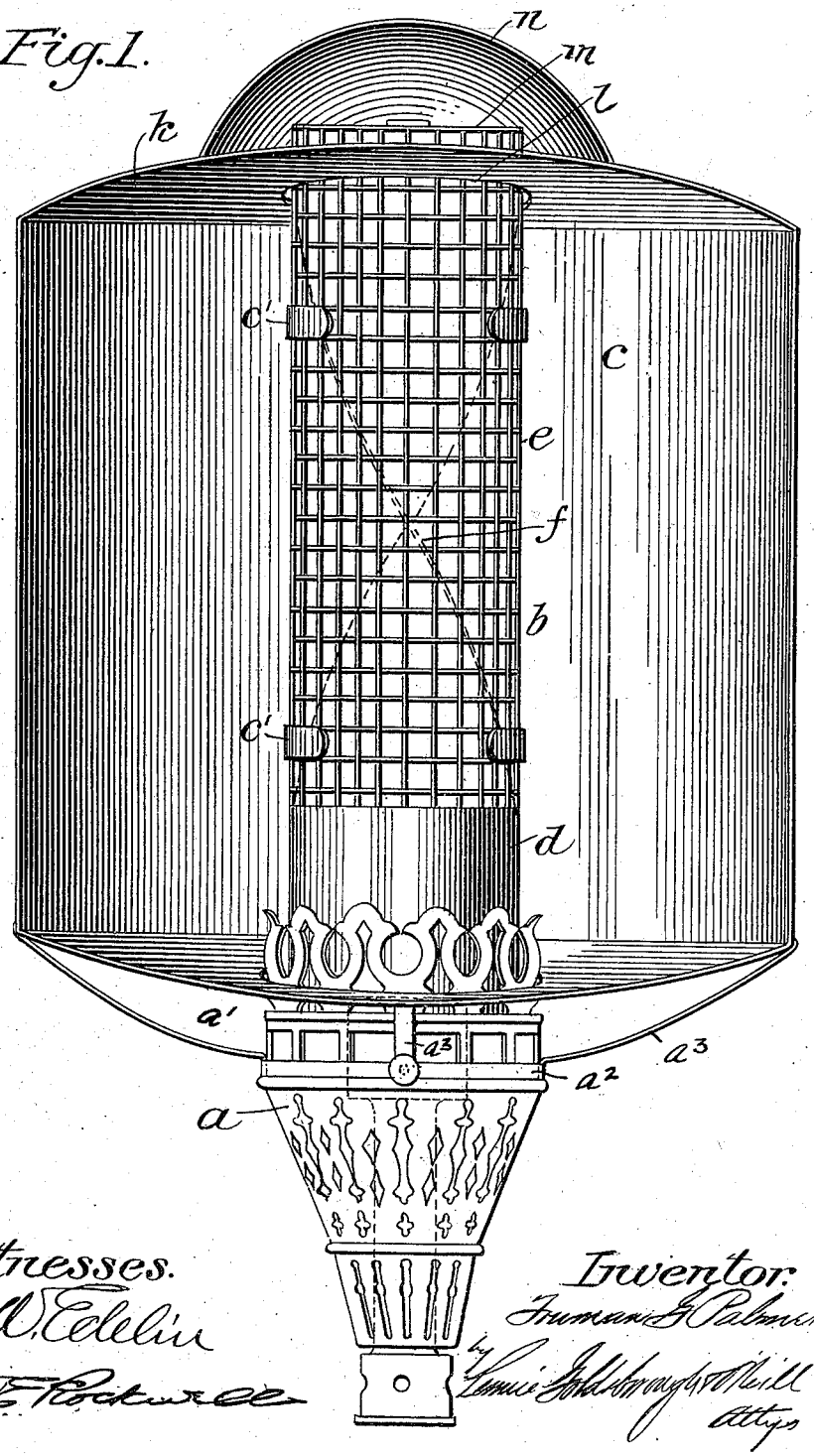

T. G. PALMER.
HEATER.
APPLICATION FILED OCT. 18, 1909.

972,905.

Patented Oct. 18, 1910.

2 SHEETS—SHEET 1.

Witnesses.

Inventor.

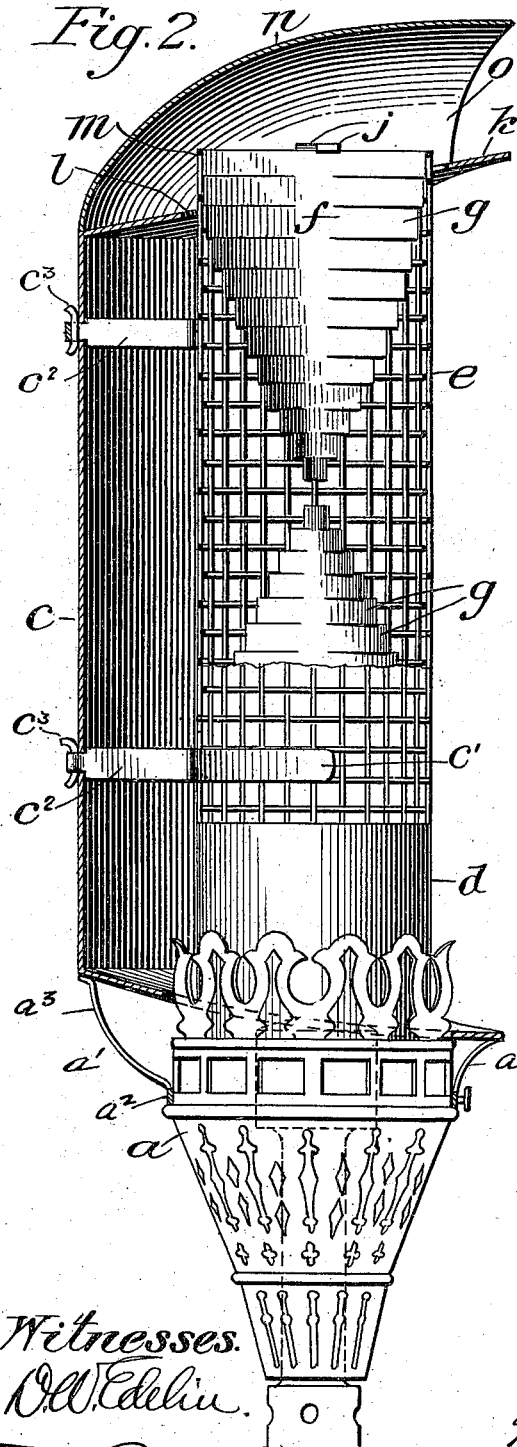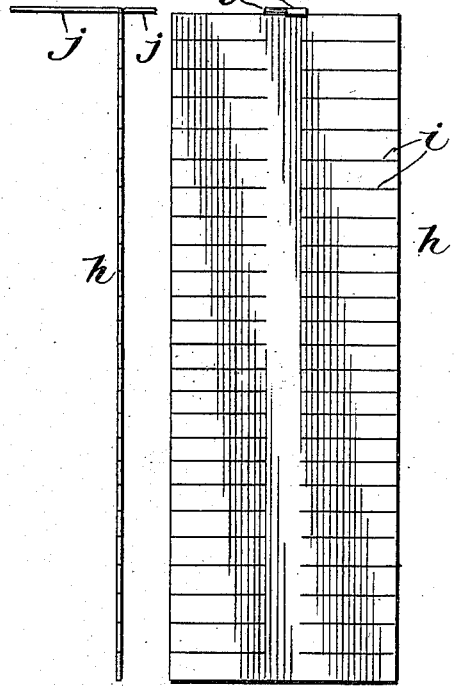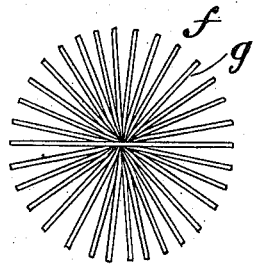

UNITED STATES PATENT OFFICE.

TRUMAN G. PALMER, OF CHICAGO, ILLINOIS.

HEATER.

972,905.  Specification of Letters Patent.  Patented Oct. 18, 1910.

Application filed October 18, 1909. Serial No. 523,193.

*To all whom it may concern:*

Be it known that I, TRUMAN G. PALMER, a citizen of the United States, residing at Chicago, county of Cook, and State of Illinois, have invented certain new and useful Improvements in Heaters; and I do hereby declare the following to be a full, clear, and exact description of the invention, such as will enable others skilled in the art to which it appertains to make and use the same.

This invention relates to heating devices of the type described in my Patent No. 949,042, dated Feb. 15, 1910, wherein a metallic heating shell with an interior baffle is employed in connection with a suitable reflector to deflect the heat waves laterally in the desired direction.

According to my prior invention the greater part of the heating effect is produced by heating the wall of the shell, that is formed of slitted metal; the primary purpose of the baffle is to deflect in lateral direction the rising gases of combustion in such a way that they will strike the wall of the shell as indicated and thereby impart to it a maximum calorific effect. The present invention, however, contemplates the provision of a heater in which the greater part of the calorific effect is obtained by the heating of the baffle, which is made of sheet metal and of proper size and shape for this purpose, the shell being formed of reticulated metal of comparatively large mesh. In this way, a large amount of heat is given off from the baffle and that given off from the shell, which is caused to glow in the usual way, is not inconsiderable.

The invention also aims to improve certain details of the heater construction as regards the specific form given to the baffle and the arrangement of the shell with respect to the reflector, as will appear from the following description.

In the accompanying drawing: Figure 1 is a front elevation of a heater constructed in accordance with the invention, Fig. 2 is a vertical central section partially broken away to show the arrangement of the baffle in the shell, Fig. 3 is a front view of the blank from which the baffle is constructed, Fig. 4 is an edge view of the blank, and Fig. 5 is a top view of the baffle as formed by twisting the blank into helical form.

In the drawing, the burner $a$ is shown as of the usual type and has placed thereon the cylindrical heating shell or transformer $b$ about which is fitted a reflector $c$. The shell $b$ is provided at its lower end with an imperforate portion $d$ located immediately above the burner, but said imperforate portion is of relatively small height and the main part of the shell is formed by a cylindrical part $e$ of reticulated metal, illustrated as comparatively coarse wire mesh. The particular material from which this portion of the shell is constructed is not, however, essential to the invention.

As before stated, the greater part of the calorific effect is produced by heating a sheet metal baffle and I have discovered that a baffle formed of a single plate having a longitudinally series of laterally offset vanes or fins will give the best results in this connection. In Fig. 2, a baffle of this kind is denoted by reference character $f$ and the vanes or fins thereof by reference character $g$. This baffle is produced by taking a substantially rectangular blank $h$ of sheet metal and slitting it transversely from the side edges to points adjacent the center, as indicated at $i$ in Fig. 3. The slits at opposite sides of the imaginary center line extending longitudinally of the blank are alined with each other, and when the opposite ends of the blank are grasped said blank is given a helical form by twisting it to the desired extent, whereby a baffle such as illustrated in Figs. 2 and 5 is created. The fins or vanes that are horizontally alined with each other retain their alinement and extend diametrically of the baffle, as shown in Fig. 5, and each pair of such vanes is offset laterally with respect to the adjacent pair so that in plan the fins or vanes entirely fill the space within the shell. The baffle $f$ may be secured in the shell in any convenient manner that may suggest itself; in the embodiment illustrated, said baffle is provided at the top with integral lateral lugs $j$ that rest on top of the shell $b$, but any other suitable arrangement might be adopted.

The reflector $c$ is provided with an upwardly inclined top $k$ having a circular opening $l$ through which the upper end of the shell $b$ protrudes to a slight extent, such protruding portion being denoted at $m$. On top of the reflector and inclosing this protruding portion of the shell is a hood $n$ that is preferably made a permanent part of the reflector structure, said hood being open only at the front, as shown at $o$, so that the gases which enter the same from the heating shell will be discharged in forward and upward direction in front of the heating shell, as appears from Fig. 2.

In order to support properly the heating shell in position and prevent its leaning in any direction, which would decrease the efficiency of the device, I find it advisable to use a clamp or clamps $c'$ that embrace the shell and are firmly supported from the wall of the reflector. In the embodiment illustrated, the spring clamps or clips $c'$ are formed of sheet metal strips bent into U-shape to embrace the shell and having doubled rearwardly directed shanks $c^2$ detachably locked in openings of the reflector wall, back of the shell, by small removable pins $c^3$. It is evident, however, that clamps of various types may be used without departing from the scope of the invention.

The reflector $c$ is preferably secured to the burner $a$ by means of a holder or spider $a'$ comprising a ring $a^2$ set on the gallery of the burner, and radiating arms $a^3$ attached to the bottom of the reflector; but this arrangement is also capable of various modifications.

In the operation of the device, the heat rising in the shell or transformer is separated into a large number of parts by the radially disposed fins or vanes $g$ of the baffle, and the baffle absorbs and gives off a large amount of heat, the deflected heat being taken up in part by the open mesh shell which is thereby caused to glow. The heat given off from the baffle and shell is deflected into the room in the desired direction by means of the reflector $c$. By the construction described the amount of calorific effect produced by the baffle is raised to the maximum, and the open mesh of the shell or transformer permits a free radiation of the heat waves from the baffle and also from the shell.

The extension of the heating shell through the top of the reflector is an important feature of the invention for the reason that by this arrangement it is possible to cause the shell to glow throughout the surface thereof that is inclosed by the body of the reflector. It is impossible to heat the transformer or shell to a red glow from top to bottom without having unconsumed gases escape from the top, but by extending the shell through the top or cap of the reflector such red glow is extended farther up the shell and there is still a place left at the top of the shell where the gases which are not hot enough to make the metal red are consumed, thereby generating heat and preventing the dissipation of such gases in the room. The hood $n$ is of importance as it prevents any considerable heat from coming in contact with the wall or parts to which the reflector is attached, and also for the reason that said hood deflects the heat laterally into the room instead of permitting it to rise vertically from the shell and be lost.

Without limiting myself to the precise construction shown, I claim:—

1. In a heater, the combination with a shell, of a separate baffle within the shell formed of a sheet metal plate with a longitudinal series of radially extending fins or vanes.

2. In a heater, the combination of a reticulated heating shell, and a separate baffle within the shell formed by a single sheet metal plate having radially extending vanes or fins.

3. In a heater, the combination of a cylindrical open mesh heating shell, and a separate baffle within the shell formed of a flat sheet metal plate with a longitudinal series of radially extending fins or vanes.

4. In a heater, the combination of an openwork heating shell, and a baffle in said shell formed of a twisted sheet metal blank having pairs of horizontally alined diametrically disposed fins or vanes, each pair being offset angularly with respect to the adjacent pair.

5. In a heater, the combination of a cylindrical openwork heating shell, and a reflector inclosing said shell and having a top with an opening through which said shell is extended upwardly.

6. The combination with a heating shell, of a reflector having a top through which the shell is extended upwardly, and a hood on top of the reflector inclosing the upper end of the shell.

7. The combination with a heating shell, of a reflector having an apertured top plate or cap through which the upper end of the shell is extended, and a hood on said top plate inclosing the upper end of the shell and open only at the front of the reflector.

8. The combination of a heating shell, a reflector partially inclosing the shell, and a clamp or clip embracing the shell and supported from the wall of the reflector.

9. The combination of a heating shell, a reflector, and a U-shaped spring clip embracing the shell and having a shank detachably locked to the reflector wall.

In testimony whereof I affix my signature, in presence of two witnesses.

TRUMAN G. PALMER.

Witnesses:
VIRGINIA L. PALMER,
FRANK RODERUS.